United States Patent

Hoshihara et al.

Patent Number: 5,249,840
Date of Patent: Oct. 5, 1993

[54] SEAT APPARATUS FOR VEHICLES

[75] Inventors: Naoaki Hoshihara, Nagoya; Yasuhisa Inaba, Handa, both of Japan

[73] Assignee: Aisin Seiki Kabushiki Kaisha, Kariya, Japan

[21] Appl. No.: 888,136

[22] Filed: May 26, 1992

[30] Foreign Application Priority Data

May 30, 1991 [JP] Japan ............................. 3-153725

[51] Int. Cl.⁵ .................................................. B60N 2/02
[52] U.S. Cl. ................................. 297/378.12; 297/367
[58] Field of Search ............... 297/367, 368, 369, 379

[56] References Cited

U.S. PATENT DOCUMENTS

| | | | |
|---|---|---|---|
| 3,973,799 | 8/1976 | Berg | 297/379 X |
| 4,382,630 | 5/1983 | Weston | 297/379 X |
| 4,469,375 | 9/1984 | Boyer . | |
| 4,629,251 | 12/1986 | Tezuka | 297/367 X |
| 4,660,886 | 4/1987 | Terada et al. | 297/379 X |
| 4,668,013 | 5/1987 | Wahlmann . | |
| 4,732,425 | 3/1988 | Terada et al. . | |
| 4,997,223 | 3/1991 | Croft | 297/379 X |

FOREIGN PATENT DOCUMENTS

| | | | |
|---|---|---|---|
| 3611929 | 10/1987 | Fed. Rep. of Germany | 297/379 |
| 2-95304 | 4/1990 | Japan . | |
| 727335 | 3/1955 | United Kingdom | 297/369 |

*Primary Examiner*—Peter M. Cuomo
*Assistant Examiner*—Michael J. Milano
*Attorney, Agent, or Firm*—Burns, Doane, Swecker & Mathis

[57] ABSTRACT

A seat apparatus for an automotive vehicle includes an upper gear fixed to a side member of a seat-back frame equipped with a retractor, a lower gear engaging with the upper gear, a pair of lower arms embracing the upper gear and the lower gear, a shaft having a coaxial shaft portion on which the pair of lower arms is supported and an eccentric shaft portion on which the upper gear is supported, a release arm supported on the coaxial shaft portion and having a distal end to which a first pin is fixed, the first pin being inserted into first registered oblong holes of the pair of lower arms, a second pin passed through a cam slot of the release arm and second registered oblong holes of the pair of lower arms, the second pin being capable of freely entering and exiting a notch in the lower gear, and a third oblong hole provided in the lower arm for receiving a third pin fixed to the upper gear. At the moment of a collision, a large load from the upper gear is received by the second pin as a shearing force.

4 Claims, 4 Drawing Sheets

SEAT APPARATUS FOR VEHICLES

BACKGROUND OF THE INVENTION

1. Field of the Invention

This invention relates to a vehicular seat apparatus having a mechanically strengthened reclining mechanism.

2. Description of the Prior Art

A seat apparatus for an automotive vehicle generally is equipped with a reclining mechanism for reclining a seat back in order provide a seated individual with maximum comfort. The reclining mechanism has an upper gear provided on the side of a seat-back frame, and a lower gear provided on the side of a seat-cushion frame. The number of teeth on one of these two gears is at least one less than the number of teeth on the other. The two gears are meshed with each other and supported on coaxial and eccentric shaft portions of a shaft. The reclining mechanism is so adapted that rotating the shaft makes it possible to recline the seat back relative to the seat cushion.

A seat belt is mandatory for the sake of passenger safety. As shown in FIG. 3, a seat apparatus 25 of the type in which a three-point seat belt 24 is incorporated in the seat includes a retractor 27 attached to a seat-back frame 26. When the vehicle sustains a collision or sudden stop, a very large rotational moment acts upon the reclining mechanism on the side of a side member of the seat-back frame 26 to which the retractor 27 is attached. The rotational moment is attributed to the weight of the belt acting upon an anchor bolt of a shoulder belt. As a consequence, a large load acts upon the portion where the upper and lower gears mesh, thereby causing deformation or breakage of the gear teeth or deformation of a release arm. In addition, a large load also acts upon a release arm and can cause deformation of the release arm.

In an effort to solve the aforementioned problem, the gears and release arm can be increased in wall thickness, and so can the related components. However, this expedient is undesirable as it merely increases the weight of the apparatus.

SUMMARY OF THE INVENTION

Accordingly, an object of the present invention is to provide a seat apparatus which eliminates the shortcomings mentioned above.

According to the present invention, the foregoing object is attained by providing a seat apparatus for an automotive vehicle, comprising an upper gear fixed to a side member of a seat-back frame equipped with a retractor; a lower gear engaging with the upper gear and having a notch; a pair of lower arms embracing the upper gear and the lower gear and having respective first oblong holes that are in registration, second oblong holes that are in registration and third oblong holes that are in registration; a shaft having a coaxial shaft portion on which the pair of lower arms is supported and an eccentric shaft portion on which the upper gear is supported; a release arm supported on the coaxial shaft portion and having a cam slot and a distal end to which a first pin is fixed, the first pin being inserted into the first oblong holes of the pair of lower arms; a second pin passed through the cam slot of the release arm and the second oblong holes of the pair of lower arms, the second pin being capable of freely entering and exiting the notch of the lower gear; and a third pin fixed to the upper gear and received in the third oblong hole of the lower arm.

In accordance with the invention, the pin of the release arm connecting the lower gear to the lower arms is received by the pair of lower arms. As a result, the rotational moment produced at the time of a collision is capable of being fully sustained and a high mechanical strength is assured.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of a seat apparatus for vehicles will now be described in detail with reference to the drawings.

Figure 1:
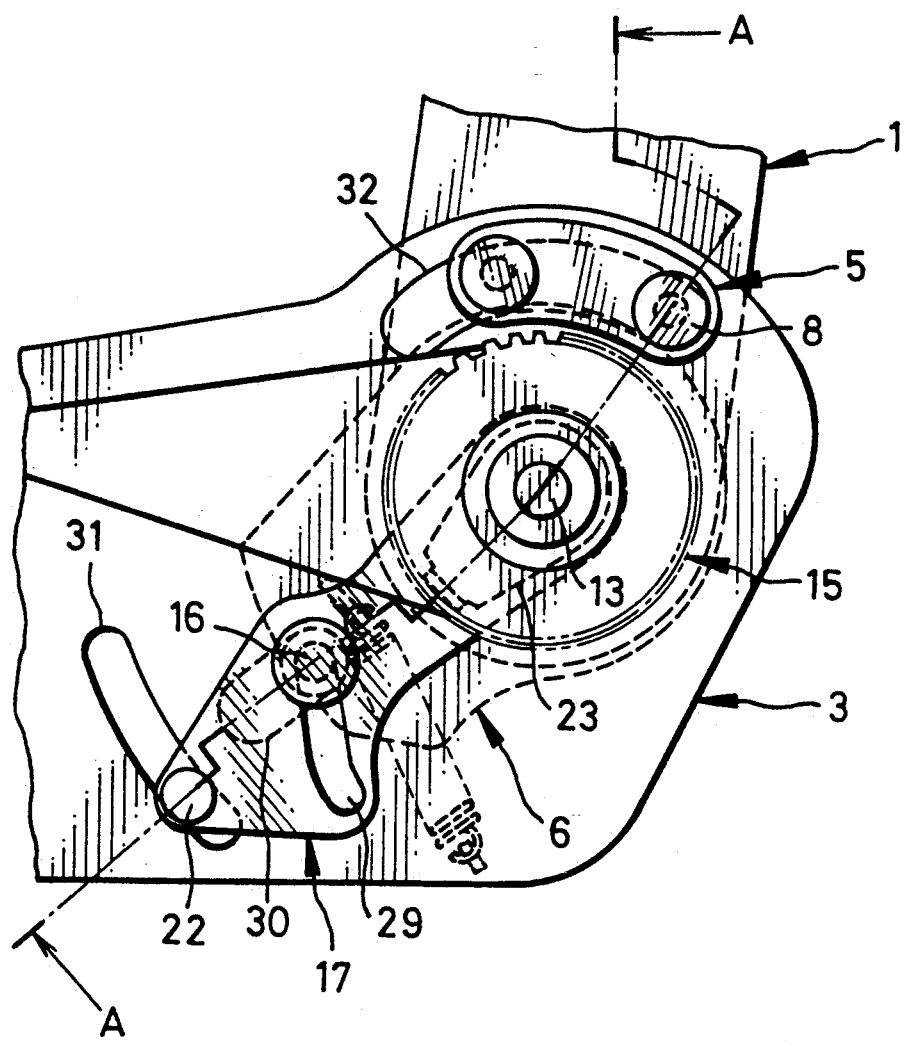
FIG. 1 is a partial front view illustrating a reclining mechanism according to an embodiment of the present invention.
Figure 2:
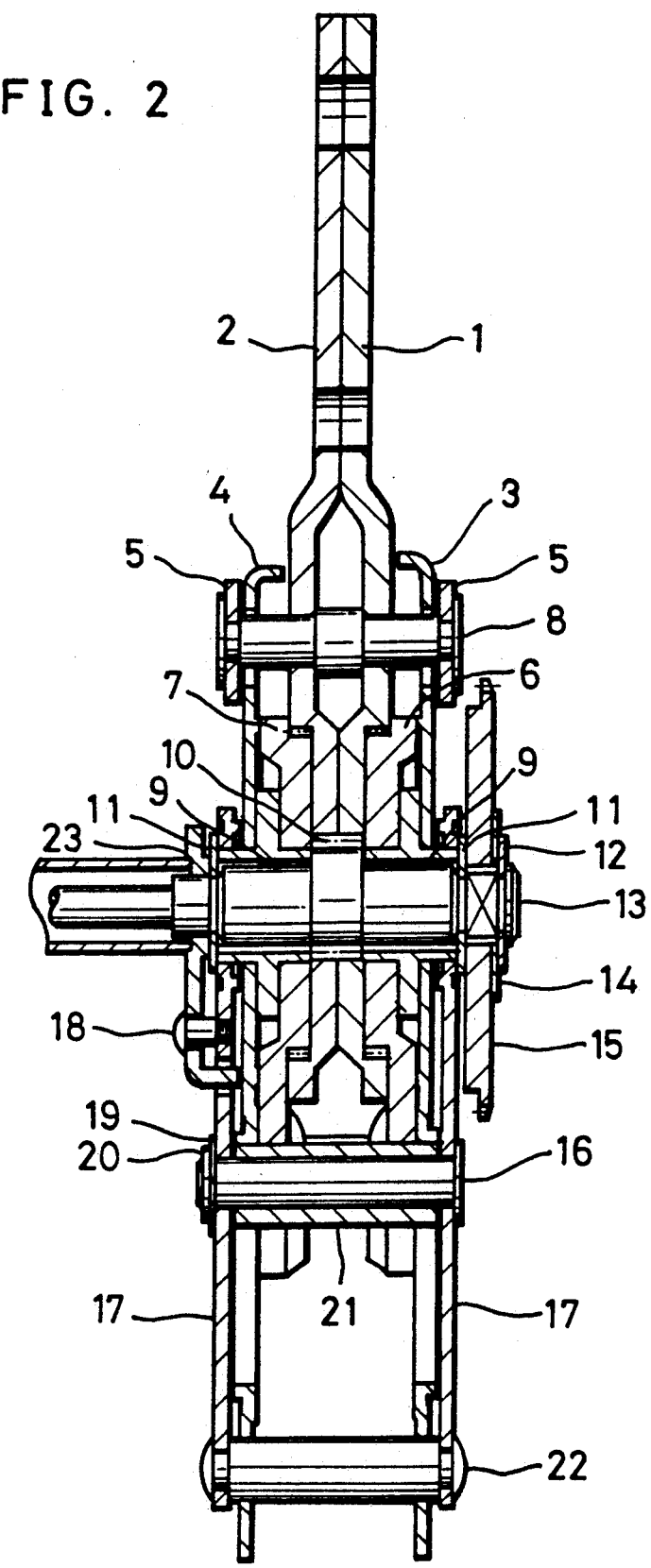
FIG. 2 is a sectional view taken along line A—A of FIG. 1.
Figure 3:
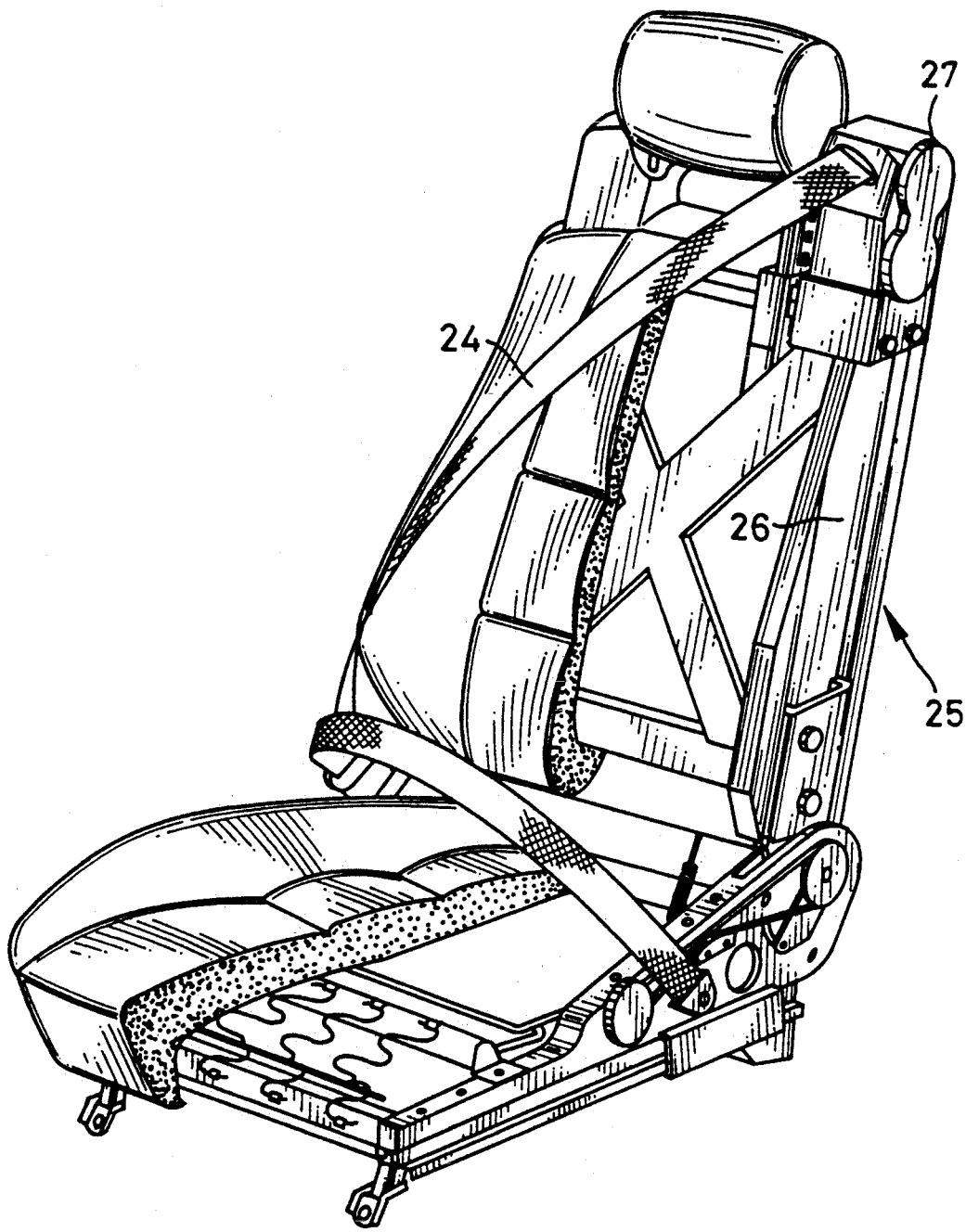
FIG. 3 is a perspective view illustrating a seat apparatus according to the embodiment of the present invention.

As shown in FIGS. 1 and 2, the seat apparatus of the invention preferably has a pair of upper gears 1, 2 secured to a side member of a seat-back frame on the retractor side thereof. Preferably, the upper gears 1, 2 mesh with a pair of lower gears 6, 7. The number of outer teeth on the upper gears 1, 2 is one greater than the number of inner teeth on the lower gears 6, 7.

The gears 1, 2, 6, 7 are supported on a shaft 13, which in turn are supported on a pair of lower arms 3, 4. The two lower gears 6, 7 are supported on a coaxial portion of the shaft 13 via a bush 9, and the two upper gears 1, 2 are supported on an eccentric portion of the shaft 13 via a bush 10. A pulley 15 is supported on the shaft 13 using a pair of E-rings 11, 12 so that the shaft 13 is capable of being rotated.

Figure 4:
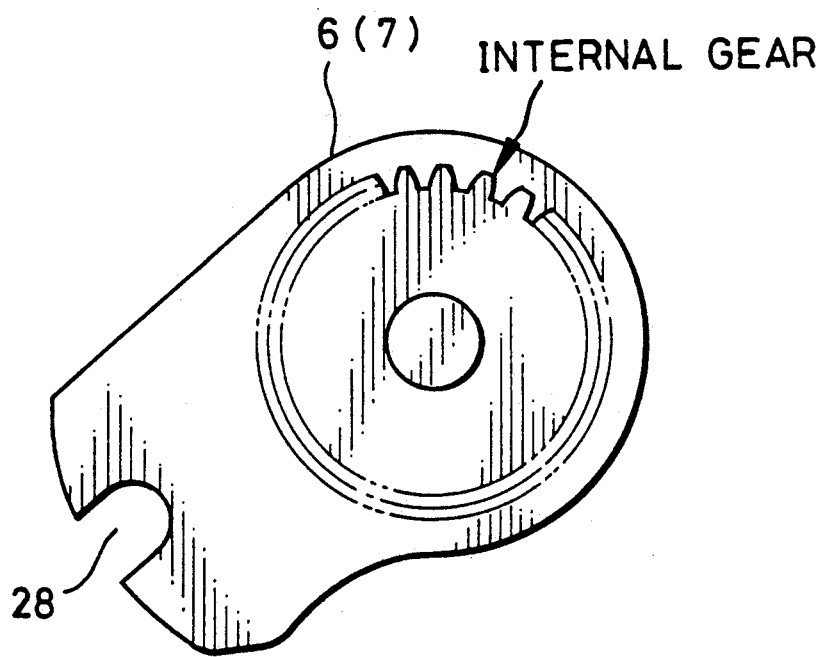
FIG. 4 is a plan view of a lower gear.

Each of the lower gears 6, 7 has a notch 28 at its lower end, as shown in FIG. 4. A pair of release arms 17 are pivotally supported on the shaft 13, and a second pin 16 is attached to the release arms 17 along with a roller 21. Each release arm 17 has a cam slot 29 into which the second pin 16 is inserted. Each of the lower arms 3, 4 is provided with a second oblong hole 30 having a central axis which passes through the center of the shaft 13. The second pin 16 is passed also through each of the second oblong holes 30.

In the embodiment of FIG. 1, the second pin 16 is passed through the notches 28 of the respective lower gears 6, 7, the second oblong holes 30 and the cam slots 29. When the release arms 17 are rotated, the second pin is guided by the cam slots 29, descends along the second oblong holes 30 and exits from the notches 28, whereby the lower gears 6, 7 are disconnected from the lower arms 3, 4, respectively. As a result, the gears 1, 2, 6, 7 are capable of being swung widely back and forth in a state in which they are not turned.

A first pin 22 at the distal ends of the release arms 17 is inserted into a first oblong hole 31 in each of the two lower arms 3, 4 to stabilize the trajectory of the release arms 17.

A pair of third pins 8 joining the two upper gears 1, 2 are passed through a third oblong hole 32 in each of the lower arms 3, 4. The two pins 8 are united by plates 5. The first and second oblong holes 31, 32 are arcuate in shape, with the centers of the arcs being the center of the shaft 13.

A bracket 23 supported on the shaft 13 is connected to the release arms 17 via a screw 17 and cut-out so that the two release arms 17 are capable of being moved. Numerals 14, 19 denote washers, and number 20 represents a E-ring.

As mentioned above, the second pin 16 exits from the notches 28 of the lower gears 6, 7 so that the lower gears 6,7 disengage from the lower arms 3, 4. To engage the lower gears 6, 7 with the lower arms 3, 4, respectively, the centers of the second oblong holes 30 and the centers of the notches 28 are aligned and the release arms 17 are manipulated to insert the second pin 16 into the notches 28 to connect the lower gears 6, 7 to the lower arms 3, 4, respectively, via the second pin 16.

At the moment of a collision, a large load acts upon the reclining mechanism on the side of the shoulder-belt anchor point. However, since this large load is received at both ends of the second pin 16 as a shearing force with respect to the lower arms 3, 4, the seat exhibits a high mechanical strength.

Since the load which acts upon the pin is borne by the lower arms, the release arms are not subjected to a large load at the time of a collision, they are easy to operate at all times and can be made light in weight.

As many apparently widely different embodiments of the present invention can be made without departing from the spirit and scope thereof, it is to be understood that the invention is not limited to the specific embodiments thereof except as defined in the appended claims.

What is claimed is:

1. A seat apparatus for an automotive vehicle, comprising:
    an upper gear fixed to a side member of a seat-back frame equipped with a retractor;
    a lower gear engaging with said upper gear and having a notch;
    a pair of lower arms embracing said upper gear and said lower gear and having respective first oblong holes that are in registration, second oblong holes that are in registration and third oblong holes that are in registration;
    a shaft having a coaxial shaft portion on which said pair of lower arms is supported and an eccentric shaft portion on which said upper gear is supported;
    a release arm supported on the coaxial shaft portion and having a cam slot and a distal end to which a first pin is fixed, said first pin being inserted into the first oblong holes of said pair of lower arms;
    a second pin passed through the cam slot of said release arm and the second oblong holes of said pair of lower arms, said second pin being capable of freely entering and exiting the notch of said lower gear; and
    a third pin fixed to said upper gear and received in the third oblong hole of said lower arm.

2. The apparatus according to claim 1, wherein said upper gear and said lower gear each comprise two plates facing each other and are disposed between said pair of lower arms.

3. The apparatus according to claim 1, wherein said first and third oblong holes are arcuate in shape and define circular arcs the center of which is a central axis of the coaxial shaft portion of said shaft, and said second oblong holes are radially extending holes having a center through which said central axis passes.

4. The apparatus according to claim 2, wherein said third pin comprises a pair of pins connected by plates.

* * * * *